United States Patent
Castagnozzi et al.

(10) Patent No.: US 7,065,685 B2
(45) Date of Patent: Jun. 20, 2006

(54) METHOD FOR NON-CAUSAL CHANNEL EQUALIZATION

(75) Inventors: Daniel M. Castagnozzi, Lexington, MA (US); Alan Michael Sorgi, San Diego, CA (US); Warm Shaw Yuan, San Diego, CA (US); Keith Michael Conroy, Perkasie, PA (US)

(73) Assignee: Applied Micro Circuits Corporation, San Diego, CA (US)

( * ) Notice: Subject to any disclaimer, the term of this patent is extended or adjusted under 35 U.S.C. 154(b) by 0 days.

(21) Appl. No.: 11/116,612

(22) Filed: Apr. 29, 2005

(65) Prior Publication Data

US 2005/0190607 A1 Sep. 1, 2005

Related U.S. Application Data

(62) Division of application No. 10/020,426, filed on Dec. 7, 2001.

(51) Int. Cl.
*H03M 13/00* (2006.01)

(52) U.S. Cl. .................................................. 714/709
(58) Field of Classification Search ................ 714/709
See application file for complete search history.

(56) References Cited

U.S. PATENT DOCUMENTS

| | | | | |
|---|---|---|---|---|
| 3,386,081 A | * | 5/1968 | Varsos | 327/33 |
| 3,449,716 A | * | 6/1969 | Cuddeback et al. | 714/709 |
| 3,480,910 A | * | 11/1969 | Brenza et al. | 714/709 |
| 4,163,209 A | * | 7/1979 | McRae | 714/709 |
| 6,915,464 B1 | * | 7/2005 | Castagnozzi et al. | 714/709 |

* cited by examiner

*Primary Examiner*—Joseph Torres
(74) *Attorney, Agent, or Firm*—Law Office of Gerald Maliszewski; Gerald Maliszewski

(57) ABSTRACT

A system and method are provided for non-causal channel equalization in a communications system. The method comprises: establishing a first threshold (V1) to distinguish a high probability "1" first bit estimate; establishing a second threshold (V0) to distinguish a high probability "0" first bit estimate; establishing a third threshold (Vopt) to distinguish first bit estimates between the first and second thresholds; receiving a non-return to zero (NRZ) data stream; comparing the first bit estimate in the data stream to a second bit value received prior to the first bit; comparing the first bit estimate to a third bit value received subsequent to the first bit; in response to the comparisons, determining the value of the first bit.

20 Claims, 13 Drawing Sheets

NRZ DATA STREAM
INPUTS

—— definite "1"

V1 ——
"0" if both 2nd and 3rd bit value decisions are "1"
"1" if only one of the 2nd and 3rd bit value decisions is a "1"
"1" if both 2nd and 3rd bit values are "0"

Vopt ——
"1" if both 2nd and 3rd bit value decisions are "0"
"0" if only one of the 2nd and 3rd bit value decisions is a "0"
"0" if both 2nd and 3rd bit values are "1"

V0 ——
definite "0"

FIG. 4

| FIRST BIT ESTIMATE Line 120a | 120b | 2ND BIT Value | 3RD BIT Value | 1ST BIT Value |
|---|---|---|---|---|
| 0 | 0 | 0 | 0 | 0 |
| 0 | 0 | 0 | 1 | 0 |
| 0 | 0 | 1 | 0 | 0 |
| 0 | 0 | 1 | 1 | 0 |
| 0 | 1 | 0 | 0 | 1 |
| 0 | 1 | 0 | 1 | 0 |
| 0 | 1 | 1 | 0 | 0 |
| 0 | 1 | 1 | 1 | 0 |
| 1 | 0 | 0 | 0 | 1 |
| 1 | 0 | 0 | 1 | 1 |
| 1 | 0 | 1 | 0 | 1 |
| 1 | 0 | 1 | 1 | 0 |
| 1 | 1 | 0 | 0 | 1 |
| 1 | 1 | 0 | 1 | 1 |
| 1 | 1 | 1 | 0 | 1 |
| 1 | 1 | 1 | 1 | 1 |

FIG. 7B

| Only One Correction per 3 bit sequence Error in the center bit ||||||
|---|---|---|---|---|---|
| Corrected Sequence | Graphic | Affected Counter || Action on Feedback ||
| OK-ER-OK | | 0 cntr | 1 cntr | − | + |
| 0 0 0 | | Cond 1 0 inc | | V1 Toggle | |
| 0 0 1 | | Cond 2 0 inc | | V2 Toggle | |
| 0 1 0 | | | Cond 1 1 inc | | V1 Toggle |
| 0 1 1 | | | Cond 2 1 inc | | V2 Toggle |
| 1 0 0 | | Cond 3 0 inc | | V3 Toggle | |
| 1 0 1 | | Cond 4 0 inc | | V4 Toggle | |
| 1 1 0 | | | Cond 3 1 inc | | V3 Toggle |
| 1 1 1 | | | Cond 4 1 inc | | V4 Toggle |

FIG. 9

METHOD FOR NON-CAUSAL CHANNEL EQUALIZATION

RELATED APPLICATIONS

This application is a Divisional Application of a pending patent application entitled, SYSTEM AND METHOD FOR NON-CAUSAL CHANNEL EQUALIZATION, invented by Castagnozzi et al., Ser. No. 10/020,426, filed Dec. 7, 2001.

BACKGROUND OF THE INVENTION

1. Field of the Invention

This invention generally relates to digital communications and, more particularly, to a system and method for minimizing the effects of inter-symbol interference in a non-return to zero (NRZ) data channel.

2. Description of the Related Art

FIG. 1 is a diagram illustrating a signal recovered from a binary symmetric, non-dispersive channel in the presence of noise (prior art). Conventionally, the signal is filtered with a transfer function matched to the signaling waveform (in this case a one unit step) and thresholded at the voltage level most likely to yield the transmitted bit. To recover the transmitted information, a hard decision must be made on the value of the received bit.

As a function of the filtering process, and sometimes as a result of the transmission process, pulse spreading occurs. That is, the energy associated with a bit spreads to neighboring bits. For small degrees of spreading these effects of this can be limited to the nearest neighbors with modest degradation in performance.

Three basic types of pulse spreading exist. The first possibility is that both the neighboring bits are a zero (no neighboring bits are a one). The second possibility is that only one of the neighboring bits (either the preceding or subsequent bit) is a one. Alternately stated, only one of the neighboring bits is a zero. The third possibility is that both neighboring bits are one. For each of these cases the likelihood of error in determining a bit value can be minimized if a different thresholds are used for different bit combinations.

FIG. 2 is a diagram illustrating received waveforms that are distorted in response to the inter-symbol interference resulting from energy dispersion (prior art). The value at the output of the filter varies with each bit, and is essentially a random process, due to the non-deterministic nature of the information, and scrambling that is often used in the transmission of NRZ data streams. However, received bits can be characterized with probability density functions, as shown. Without knowledge of the neighboring bits, a single probability density function could be extracted that represents the random behavior of the input over all conditions and all sequences. However, conditional probability density functions can be defined for the three cases mentioned above. Namely, probability density functions can be defined for the cases where there are zero neighboring ones, only one neighboring one, and two neighboring ones.

If the bit value decision process could be made using the knowledge of the decision made on the preceding decoded bit, and with a measurement of a subsequent decoded bit, then the corresponding probability density function could be selected to make a more accurate decision on the current bit decision. However, the cost and accuracy of conventional analog-to-digital (A/D) conversion circuits make such a solution impractical.

The degree of dispersion exhibited by a channel, and hence the separation of the conditional probability density functions, varies in response to a number of fixed and variable factors. Effective dispersion mitigation techniques must therefore be easily optimized to the channel and somewhat adaptive to changes in the channel due to aging, temperature changes, reconfiguration, and other possible influences.

It would be advantageous if inter-symbol interference caused by energy dispersion in a received NRZ data channel could be minimized.

It would be advantageous if the bit decision thresholds could be modified to take account of the dispersed energy in the neighboring bits in the NRZ data stream.

SUMMARY OF THE INVENTION

Many communication channels exhibit temporal spreading of the signaling waveform when propagating over long distances or over non-linear media. This phenomenon is not effectively addressed by traditional linear equalization techniques due to the non-causal nature of the impairment. A method is presented to reduce the effects of pulse spreading on hard-decision error rate in communication systems affected by this problem. The method utilizes multiple decision thresholds for each data bit. Post-processing of the multiple decision data is employed to reduce the data to a single hard decision per bit. The multiple data thresholds are adjusted for optimal mitigation of the spreading effect.

The proposed approach to this problem is to perform multiple decisions on every bit with a threshold for each of the above-mentioned conditional probability density functions. The multiple decision data is stored for several bit times, to allow a calculation to be made on the succeeding bits. This calculation is then used to select the threshold most appropriate given the estimated neighbor values. The refined decision is output from the device and fed-forward to be used in processing of subsequent bits.

Accordingly, a method is provided for non-casual channel equalization in a communications system. The method comprises: establishing a first threshold (V1) to distinguish a high probability "1" first bit estimate; establishing a second threshold (V0) to distinguish a high probability "0" first bit estimate; establishing a third threshold (Vopt) to distinguish first bit estimates between the first and second thresholds; receiving a non-return to zero (NRZ) data stream. Typically, the data stream is encoded with forward error correction (FEC). The method further comprises: comparing a first bit estimate to a second bit value received prior to the first bit; comparing the first bit estimate to a third bit value received subsequent to the first bit; in response to the comparisons, determining the value of the first bit.

Establishing a third threshold (Vopt) includes: distinguishing NRZ data stream inputs below the first threshold and above the third threshold as a "0" if both the second and third bits are "1" values, as a "1" if only one of the second and third bits is a "1" value, and as a "1" if both the second and third bit values are a "0"; and, distinguishing NRZ data stream inputs above the second threshold and below the third threshold as a "1" if both the second and third bits are a "0" value, as a "0" if only one of the second and third bits is a "0" value, and as a "0" is both the second and third bit values are a "1".

In one aspect the method further comprises: following the determination of the first bit values, FEC decoding the first bit values; and, using the FEC corrections of the first bit values to adjust the first, second, and third threshold values.

Alternately, an averaging process is used to track and maintain the threshold values.

Additional details of the above-described method, and a non-casual channel equalization communication system are provided below.

BRIEF DESCRIPTION OF THE DRAWINGS

FIG. 4 is a graph illustrating the thresholds established by the multi-threshold circuit.

FIGS. 7a and 7b are a schematic block diagram and associated truth table of the non-casual circuit of FIGS. 3 and 6 in greater detail.

FIG. 9 is a graph illustrating the operation of the threshold generators as embodied in FIG. 8.

DETAILED DESCRIPTION OF THE PREFERRED EMBODIMENTS

Figure 1:
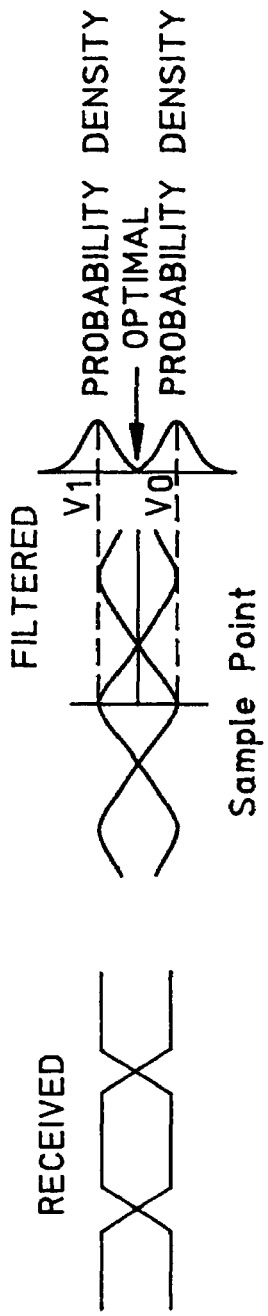
FIG. 1 is a diagram illustrating a signal recovered from a binary symmetric, non-dispersive channel in the presence of noise (prior art).
Figure 2:
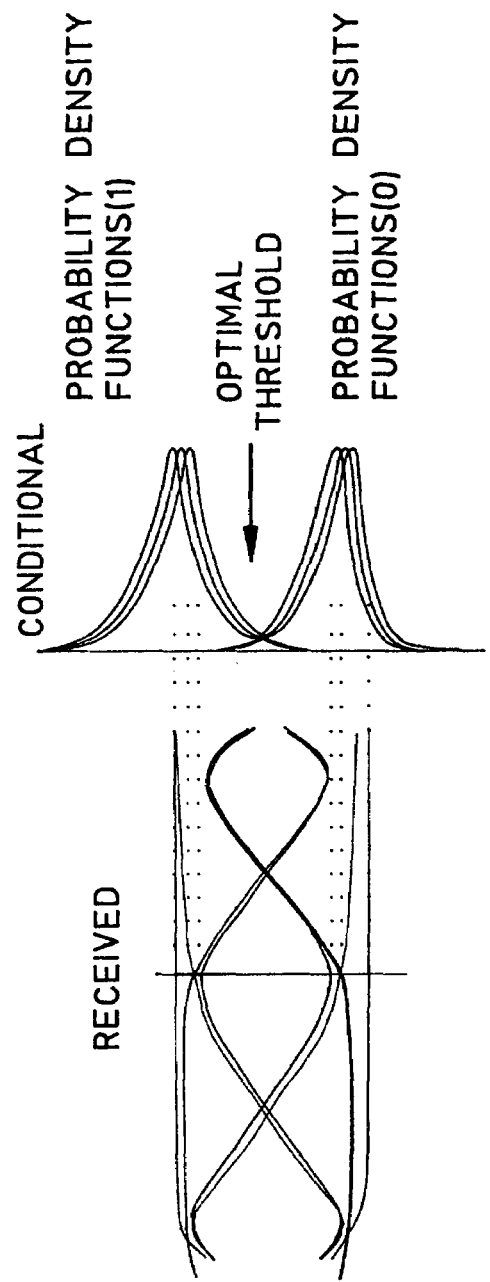
FIG. 2 is a diagram illustrating received waveforms that are distorted in response to the inter-symbol interference resulting from energy dispersion (prior art).
Figure 3:
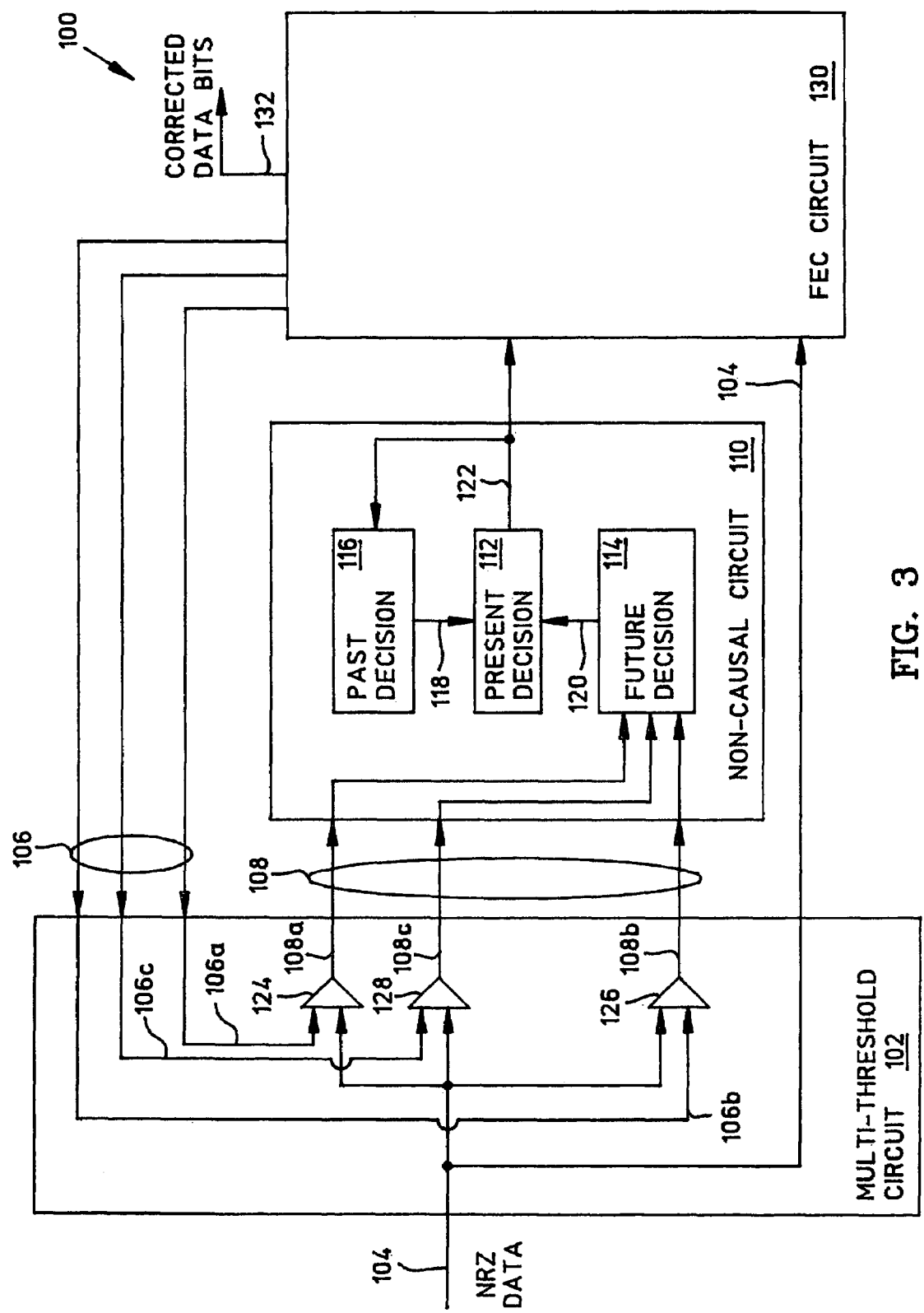
FIG. 3 is a schematic block diagram of the present invention non-casual channel equalization communication system.

FIG. 3 is a schematic block diagram of the present invention non-casual channel equalization communication system. The system 100 comprises a multi-threshold decision circuit 102 having an input on line 104 to accept a non-return to zero (NRZ) data stream, and an input on line 106 to accept threshold values. The multi-threshold decision circuit 102 has outputs on line 108 to provide bit estimates responsive to a plurality of voltage threshold levels. A causal circuit 110 has inputs on line 108 to accept the bit estimates from the multi-threshold decision circuit 102. The causal circuit 110 compares a current bit estimate (a first bit) to bit values decisions made across a plurality of clock cycles. The causal circuit 110 has an output to supply a bit value decision for the current bit estimate determined in response to the causal bit value comparisons.

The causal circuit 110 includes a present decision circuit 112, a future decision circuit 114, and a past decision circuit 116. The future decision circuit has inputs connected to the multi-threshold circuit outputs on line 108. The future decision circuit 114 has outputs to supply the first bit estimate and the third bit value (as explained below). The present decision circuit 112 has inputs to accept the first bit estimate, the third bit value, and a second bit value from the past decision circuit 116. The present decision circuit 112 compares the first bit estimate in the data stream to the second bit value received prior to the first bit estimate, represented as being supplied from the past decision circuit 116 on line 118. The present decision circuit 112 also compares the first bit estimate to the third bit value received subsequent to the first bit estimate, represented as being from the future decision circuit 114 on line 120. The present decision circuit 112 has an output on line 122 to supply a first bit value determined in response to comparing the first bit estimates to the second and third bit values.

FIG. 4 is a graph illustrating the thresholds established by the multi-threshold circuit. The following discussion should be considered in light of both FIGS. 3 and 4. The multi-threshold circuit 102 includes a first comparator 124 having an input to accept the NRZ data stream on line 104, an input connected on line 106a to establish a first threshold (V1), and an output on line 108a to supply a signal distinguishing when the NRZ data stream input has a high probability of being a "1" bit value. A second comparator 126 has an input on line 104 to accept the NRZ data stream, an input on line 106b to establish a second threshold (V0), and an output on line 108b to supply a signal distinguishing when NRZ data stream input has a high probability of being a "0" bit value. More literally, the second comparator 126 supplies a "0" when the NRZ data stream input on line 104 has a high probability of being a "0".

A third comparator 128 has an input on line 104 to accept the NRZ data stream, an input on line 106c to establish a third threshold (Vopt), and an output on line 108c to provide a signal when the NRZ data stream input has an approximately equal probability of being a "0" value as a "1" value. Distinguishing between a "1" and a "0" is a process that is performed by the non-casual circuit 110.

In some aspects of the system, the multi-threshold circuit 102 accepts an NRZ data stream encoded with forward error correction (FEC). Then, the system 100 further comprises a forward error correction (FEC) circuit 130 having an input on line 122 to receive the (first) bit values from the causal circuit 110. The FEC circuit 130 decodes the incoming data stream and corrects bit value in response to the decoding. The FEC circuit 130 has an output on line 106, specifically lines 106a, 106b, and 106c, to supply threshold values to the multi-threshold circuit 102 in response to the FEC corrections. The FEC circuit 130 has an output on line 132 to supply a stream of corrected data bits.

The multi-threshold circuit 102 and the non-casual circuit 110 work together perform a non-casual analysis, regardless of whether the system incorporates the FEC circuit 130. When the multi-threshold circuit 102 receives a NRZ data stream input below the third threshold (Vopt) and above the second threshold (V0), the present decision circuit (of the non-casual circuit 110) responds by supplying a (first) bit value of "1" on line 122, if both the second and third bit values are "0" on lines 118 and line 120, respectively. Otherwise, the present decision circuit 112 supplies a bit value of "0", if only one of the second and third bit values is a "0", or if both the second and third bit values are a "1". When the multi-threshold circuit 102 receives a NRZ data stream input above the third threshold and below the first threshold, the present decision circuit 112 responds by supplying a bit value decision of "0" if both the second and third bit values are "1". The present decision circuit 112 supplies a bit value decision of "1" if only one of the second and third bits is a "1" value, or if both the second and third bit values are a "0".

Figure 5:
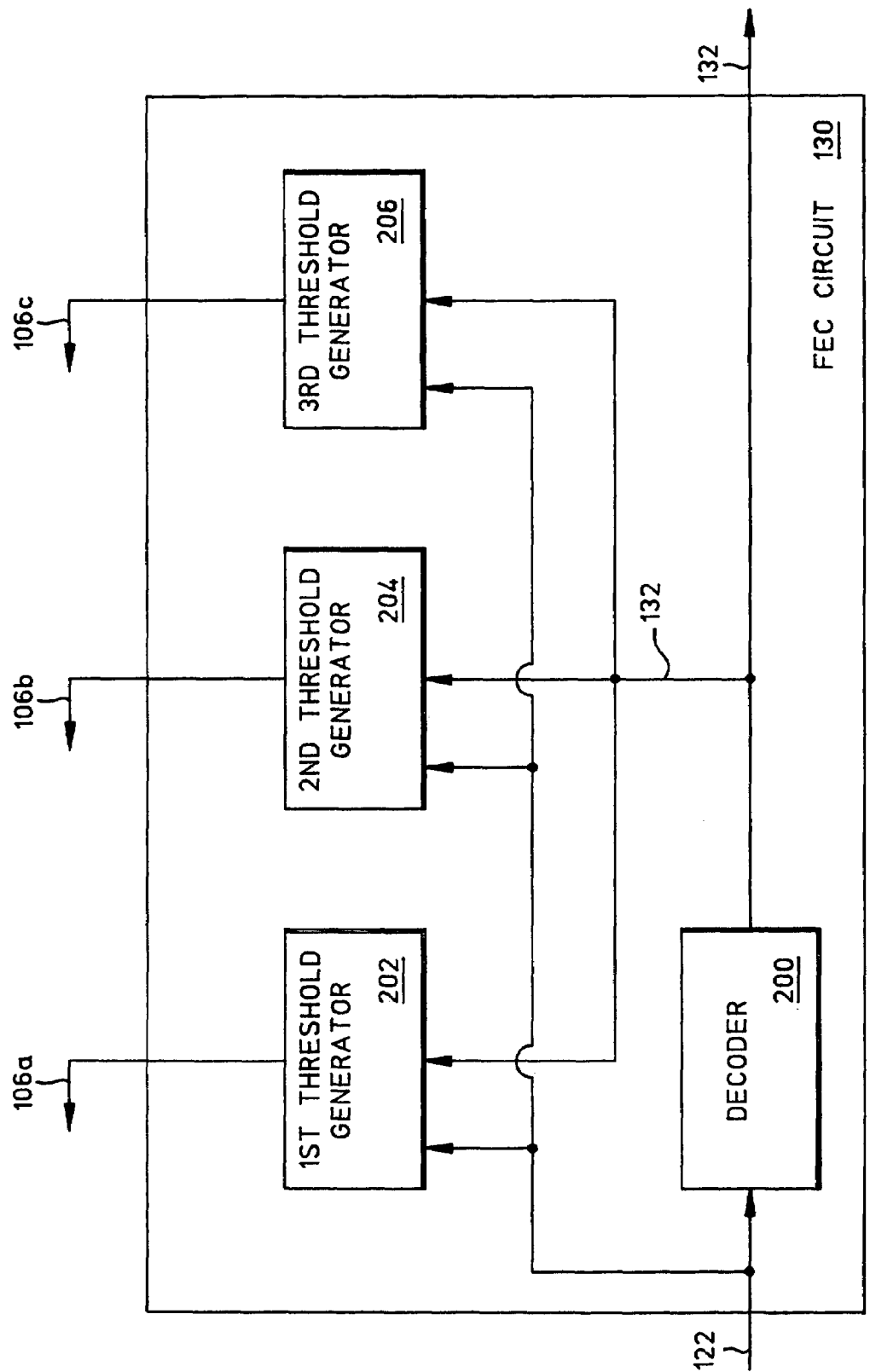
FIG. 5 is a schematic block diagram detailing the FEC circuit of FIG. 3.

FIG. 5 is a schematic block diagram detailing the FEC circuit 130 of FIG. 3. The FEC circuit 130 includes a decoder 200 having an input to accept the bit value on line 122 and an output to supply the stream of corrected data bits on line 132. The FEC circuit 130 also includes a first threshold generator 202 having an input on line 132 to accept the stream of corrected data bits. The first threshold generator 202 also has an input to accept the (first) bit values from the non-casual circuit on line 122. The first threshold generator 202 tracks the number of corrections in the first bit when the first bit value is determined to be a "0" and the second and third bits are both "1" values. That is, lines 122 and 132 are compared. Likewise, the first threshold generator 202 tracks the number of corrections in the first bit when the first bit is determined to be a "1" value and the second and third bits are both "1" values. The first threshold generator 202 has an output on line 106a to supply the first threshold (V1) in response to corrections tracked when the second and third bits are both "1" values.

The FEC circuit 130 also includes a second threshold generator 204 having an input on line 132 to accept the stream of corrected data bits. The second threshold generator 204 has an input to accept the bit values from the non-casual circuit on line 122. The second threshold generator 204 tracks the number of corrections in the first bit when the first bit is determined to be a "0" value and the second and third bits are both "0" values. The second threshold generator 204 tracks the number of corrections in the first bit when the first bit is determined to be a "1" value and the second and third bits are both "0" values. The second threshold generator 204 has an output on line 106b to supply the second threshold (V0) in response to corrections tracked when the second and third bits are both "0" values.

The FEC circuit 130 includes a third threshold generator 206 having an input on line 132 to accept the stream of corrected data bits. The third threshold generator 206 has an input on line 122 to accept bit values from the non-casual circuit. The third threshold generator 206 tracks the number of corrections in the first bit when the first bit is determined to be a "0" value and only one of the second and third bits is a "1" value. Alternately, corrections could be tracked of when the first bit is determined to be a "1" value and only one of the second and third bits is a "1" value. The third threshold generator 206 has an output on line 106c to supply the third threshold (Vopt) in response to corrections tracked in the first bit when one of the second or third bit values is a "1" value. The threshold generators 202–206 can supply an analog voltage on line 106, or a digital signal that is translated into an analog voltage at the multi-threshold circuit.

In another aspect of the system 100, the FEC circuit 130 third threshold generator 206 just tracks the number of corrections in the first bit when the first bit is determined to be a "1" value, without regard to the previous or subsequent bit values, and adjusts the third threshold (Vopt) in response to corrections tracked when the first bit is determined to be a "1" value. Alternately, third threshold generator 206 tracks the number of corrections in the first bit when the first bit is determined to be a "0" value, without regard to the previous or subsequent bit values, and adjusts the third threshold (Vopt) in response to corrections tracked when the first bit is determined to be a "0" value. That is, the Vopt threshold is generated without non-casual analysis.

Figure 6:
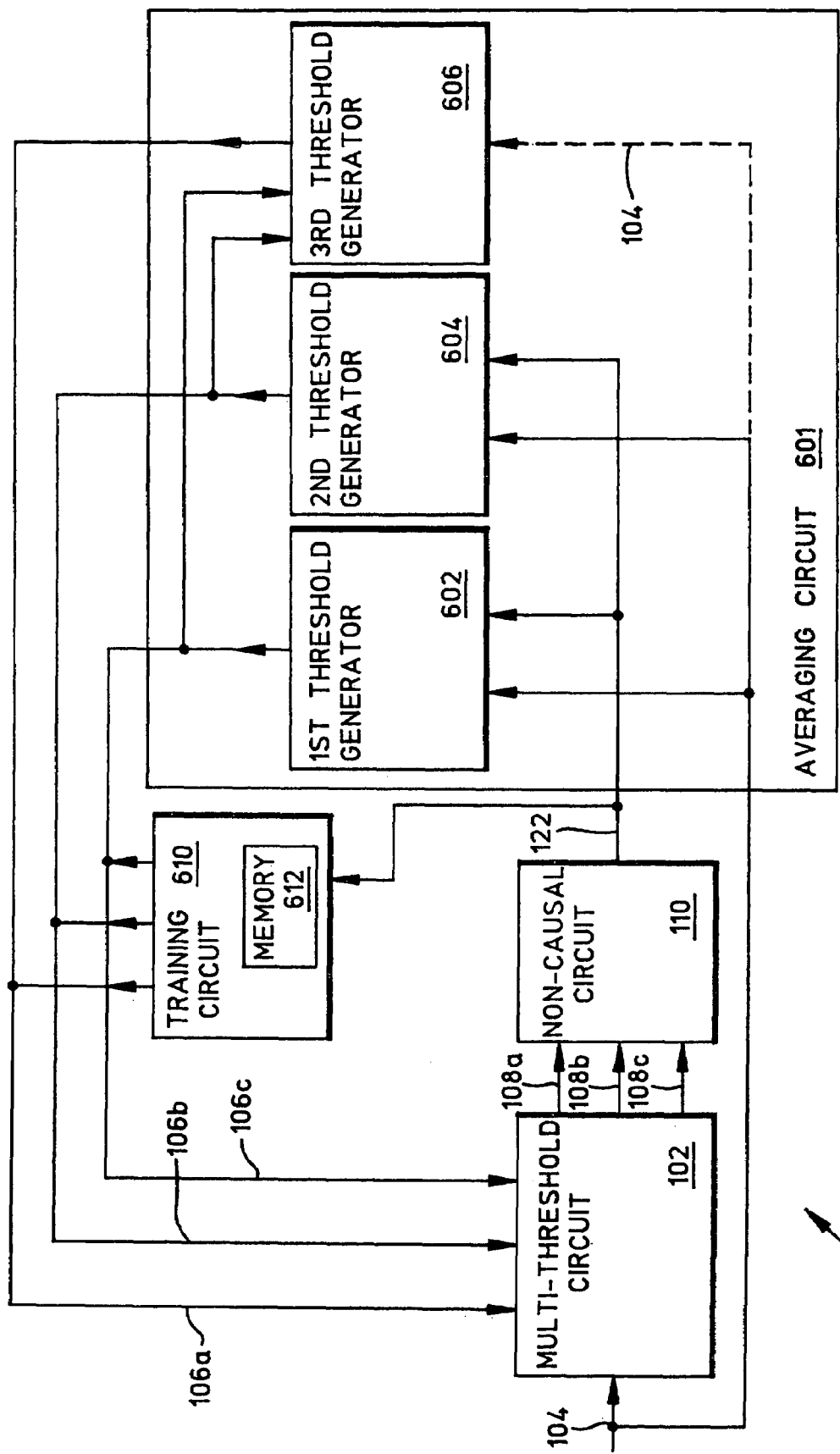
FIG. 6 is a schematic block diagram illustrating an alternate aspect of the system, where an averaging circuit is used instead of the FEC circuit.

FIG. 6 is a schematic block diagram illustrating an alternate aspect of the system, where an averaging circuit is used instead of the FEC circuit. The multi-threshold circuit 102 and the non-casual circuit 110 are the same as explained in the description of FIG. 3. In this aspect of the system 600, long-term averages are maintained to minimize processing in the determination of the threshold settings. An averaging circuit 601 is shown to "hold" the threshold generators described below. However, it should be understood that the threshold generators could alternately be included as part of the multi-threshold circuit 102 or the non-casual circuit 110. A first threshold generator 602 has an input to accept the output of the non-casual circuit (first bit value) on line 122. The first threshold generator 602 also has an input connected on line 104 to accept the NRZ data stream input. The first threshold generator 602 tracks the NRZ data stream inputs (in the clock period associated with the first bit) when the second and third bit values both equal "1" and maintains a long-term average of the tracked NRZ data stream input. That is, an averaged is maintained of the NRZ data stream voltage when the second and third bit values equal "1". The first threshold generator 602 supplies the first threshold (V1) responsive to the long-term average.

Likewise, a second threshold generator 604 has an input connected to the output of the non-casual circuit 110 on line 122 and an input to accept the NRZ data stream input on line 104. The second threshold generator 604 tracks the NRZ data stream inputs when the second and third bit values both equal "0" and maintains a long-term average of the NRZ data stream inputs. The average NRZ data stream voltage is kept when the second and third bits have a "0" value. The second threshold generator 604 supplies the second threshold (V0) on line 106b responsive to the long-term average.

In the long-term average scenario, processing is even further reduced with respect to a third threshold generator 606. The third threshold generator 606 has inputs on lines 106a and 106b to accept the first (V1) and second (V0) thresholds, respectively. The third threshold generator 606 has an output on line 106c to supply the third threshold (Vopt) responsive to the first and second thresholds. There are many different algorithms that can be used to select the third threshold value. In one aspect of the system 600, the third threshold generator 606 supplies the third threshold approximately midway between the first and second thresholds. This threshold can be further adjusted to account for asymmetrical noise distribution. Note that the present invention system 600 may incorporate FEC processing downstream from the non-casual circuit 110 (not shown). The threshold generators 602–606 can supply an analog voltage on line 106, or a digital signal that is translated into an analog voltage at the multi-threshold circuit.

In another aspect of the system 600, the third threshold generator accepts the NRZ data stream input, shown as a dotted line 104. The third threshold generator 606 maintains the average voltage, or a digital representation of the average voltage, on the NRZ data stream input. Note, this is a measurement of the NRZ data stream without regard to non-casual analysis, or the analysis of bit values. The third threshold generator 606 supplies the third threshold (Vopt) at an output on line 106c in response to the measured average. The third threshold can be set the measured average, for example. Note in this aspect, the input lines 106a and 106b are not needed. With pseudorandom scrambling it assumed that the average voltage is a result of an equal number of "0" and "1" bits being received on line 104. This method of generating the third threshold is very effective when the noise distribution is symmetrical.

In some aspects of the system, the threshold values are initialized using training data. The training data is a stream of predetermined NRZ data, for example, an alternating pattern of "0s" and "1s". The multi-threshold circuit 102 receives NRZ training data input on line 104 and processes it as described above. The non-casual circuit 110 supplies first bit values on line 122 responsive to the received NRZ training data as described above. The system 600 further comprises a training circuit 610 with a memory 612 including the predetermined training data. The training circuit 610 has an input to accept the first bit values from the non-casual circuit 110 on line 122. The training circuit 610 compares the received first bit values to the training data in memory. This comparison operation would be equivalent to the explanation of FIG. 5, where the FEC circuit compares corrected data to the first data bit values, and will not be repeated in the interest of brevity. The training circuit 610 supplies first, second, and third threshold values at an output on lines 106*a*, 106*b*, and 106*c*, respectively, in response to the comparisons. Also, as above, the training circuit would include threshold generators (not shown). Note that a training circuit, although not shown, could also be used in the system of FIG. 3. After initialization, either the FEC process (FIG. 3), or the averaging process (FIG. 6), can be used to further correct the threshold values as described above.

Figure 7A:
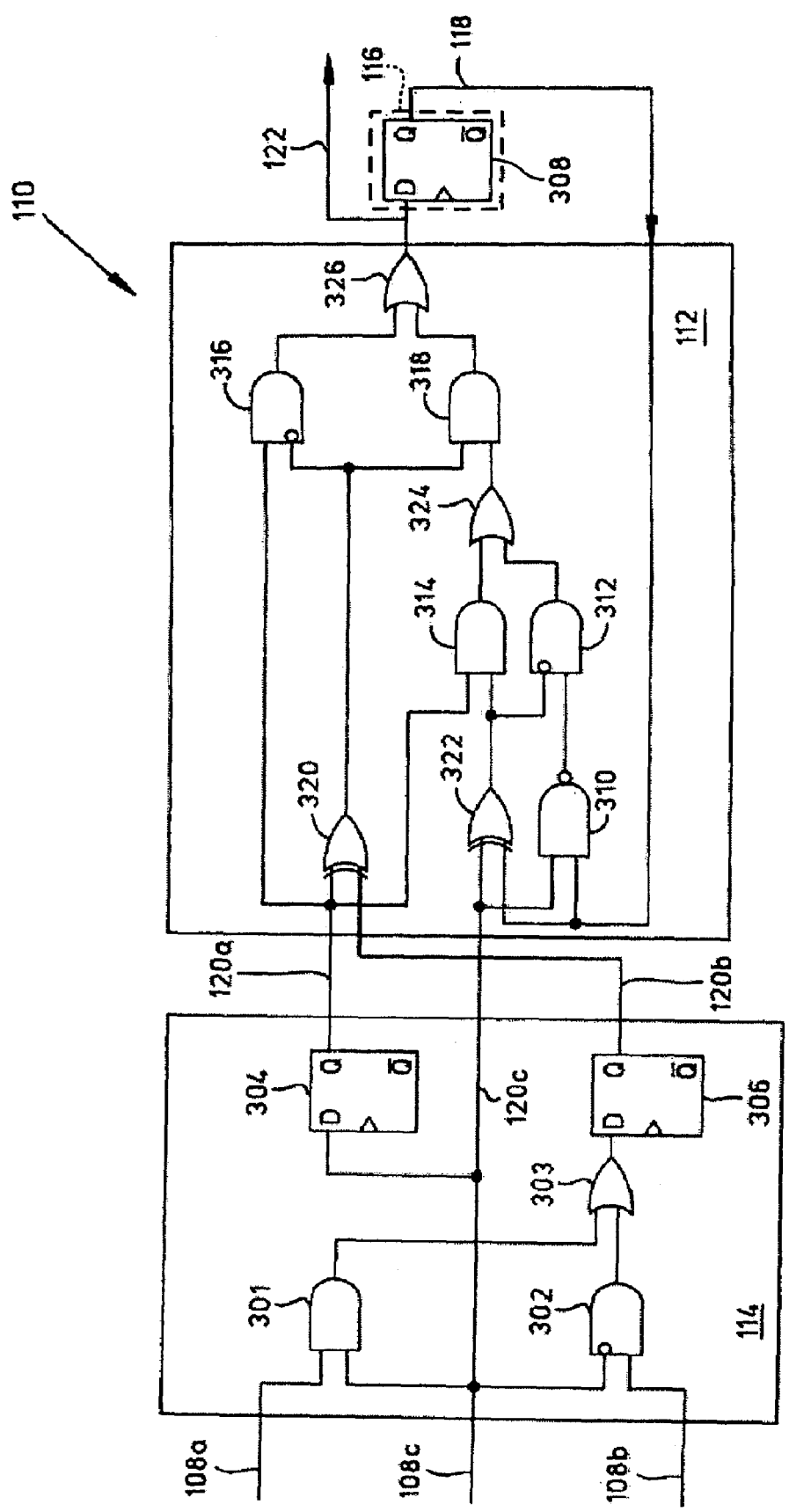

FIGS. 7*a* and 7*b* are a schematic block diagram and associated truth table of the non-casual circuit 110 of FIGS. 3 and 6 in greater detail. FIG. 7*a* represents only one of many designs that can be used to embody the invention. The future decision circuit 114 has inputs connected to the outputs of the first, second, and third comparators of the multi-threshold circuit on lines 108*a*, 108*b*, and 108*c*, respectively. These three lines correspond to the thresholds shown in FIG. 4. The future decision circuit 114 passes the third comparator signal through on line 120*c*. This signal is called the third bit value. The future decision circuit 114 performs AND and OR operations using AND circuit 301, AND circuit 302, and OR circuit 303. Delays of one clock cycle are added using flip-flops 304 and 306. When the NRZ data stream input is less than V0, the estimates on line 120*a* and 120*b* are "0,0", respectively. When the NRZ data stream input is between Vopt and V0, the estimates on lines 120*a* and 120*b* are "0,1", respectively. When the NRZ data stream input is between Vopt and V1, the estimates on lines 120*a* and 120*b* are "1,0", respectively. When the NRZ data stream input is above V1, the estimates are lines 120*a* and 120*b* are "1, 1", respectively. The combination of lines 120*a* and 120*b* is called the first bit estimate.

The past decision circuit 116 delays the first bit value on line 122 one clock cycle to supply the second bit value on line 118. Again, a D flip-flop 308 is used for the delay.

The present decision circuit 112 has inputs connected to the future decision circuit outputs to accept the first bit estimate and third bit value on lines 120*a*, 120*b*, and 120*c*, respectively. The present decision circuit 112 supplies a first bit value by comparing the first bit estimate to situations when the second and third bit decision values are both "1", when the second and third bit value decisions are both "0", and when only one of the second and third bit value decisions is a "1". To accomplish these above-stated goals, AND circuits 310 through 318 are employed. Note that AND circuits 316 and 318 have one inverted input and that 310 has an inverted output (NAND). Also used are OR and XOR gates 320 through 326. Again, alternate circuit designs can accomplish the same functions. More important is the relationship between the signal inputs and signal outputs.

FIG. 7*b* is a truth table illustrating the operation of the present decision circuit 112 of FIG. 7*a*. The non-casual circuit 110 of the present invention systems 100 and 600 can be implemented using many different combinations of circuits. More critical is the actual task performed. This task is more clearly defined in light of the truth table diagram.

The first four lines in the table illustrate the case where the NRZ data input, at a clock period associated with a first bit, is below V0. The first bit value is made in comparison to the four different combinations of the second and third bit values. Likewise, the second four lines in the table illustrate the case where the NRZ data input, at a clock period associated with a first bit, is above V0 and below Vopt. The third set of four lines in the table illustrates the case where the NRZ data input is above Vopt, but below V1. The last set of four lines in the table illustrates the case where the NRZ data input is above V1.

Functional Description

Returning to FIGS. 3 and 6, in some aspects of the system 100/600, the NRZ input signal is buffered (not shown). The NRZ data signal is provided to the multiple threshold comparators 124 through 126. In some aspects of the system 100/600 circuits, not shown, a timing recovery circuit is used at the output of the comparators on lines 108*a* through 108*c*. The timing recovery circuit generates a clock and sample signal from the received data. The sample signal is synchronized to the center of the data bit. In this implementation, a method for offsetting the sample point is provided to compensate device or channel specific anomalies.

The non-casual circuit 110 is used as a high performance decision device prior to FEC decoding in the system 100. FEC decoding provides additional information on the validity of the estimates made by the non-casual circuit 110 as a by-product of the error correction procedure. This information can be processed and used to optimize the decision points of multi-threshold circuit 102. Error rate information on the relative probability of a ones ("1s") error vs. a zeros ("0s") error is collected for the four cases of the probability density function (PDF).

Specifically:
    PDF 1) P(errorred one|no neighboring 1s)
        P(errorred zero|no neighboring 1s)
    PDF 2) P(errorred one|preceding neighbor 1)
        P(errorred zero|preceding neighbor 1)
    PDF 3) P(errorred one|following neighbor 1)
        P(errorred zero|following neighbor 1)
    PDF 4) P(errorred one|two neighboring 1s)
        P(errorred zero|two neighboring 1s)

Since most FEC encoded systems are also scrambled to insure a 50% mark ratio, statistical data for each of the three cases can be reduced to a ratio. Each threshold can be adjusted to achieve the ones/zero ratio that provides the best fit for the channel in use. In many cases this will be ~50%. For cases in which dispersion is symmetric, PDF 2 and PDF 3 are combined to a single statistic.

With respect to the threshold generators of FIG. 5, one embodiment of the system would be to use eight counters and four sets of feedback control signals for the purpose of dispersion mitigation, V1±, V2±, V3±, and V4±. A three-set mode could be achieved by combining the statistics in condition 2 and 3 in the third threshold generator. A description of the four conditions that define each statistic set follows:
    Condition 1: 0 before, 0 after error;
    Condition 2: 1 before, 0 after error;
    Condition 3: 0 before, 1 after error; and,
    Condition 4: 1 before, 1 after error.

Figure 8:
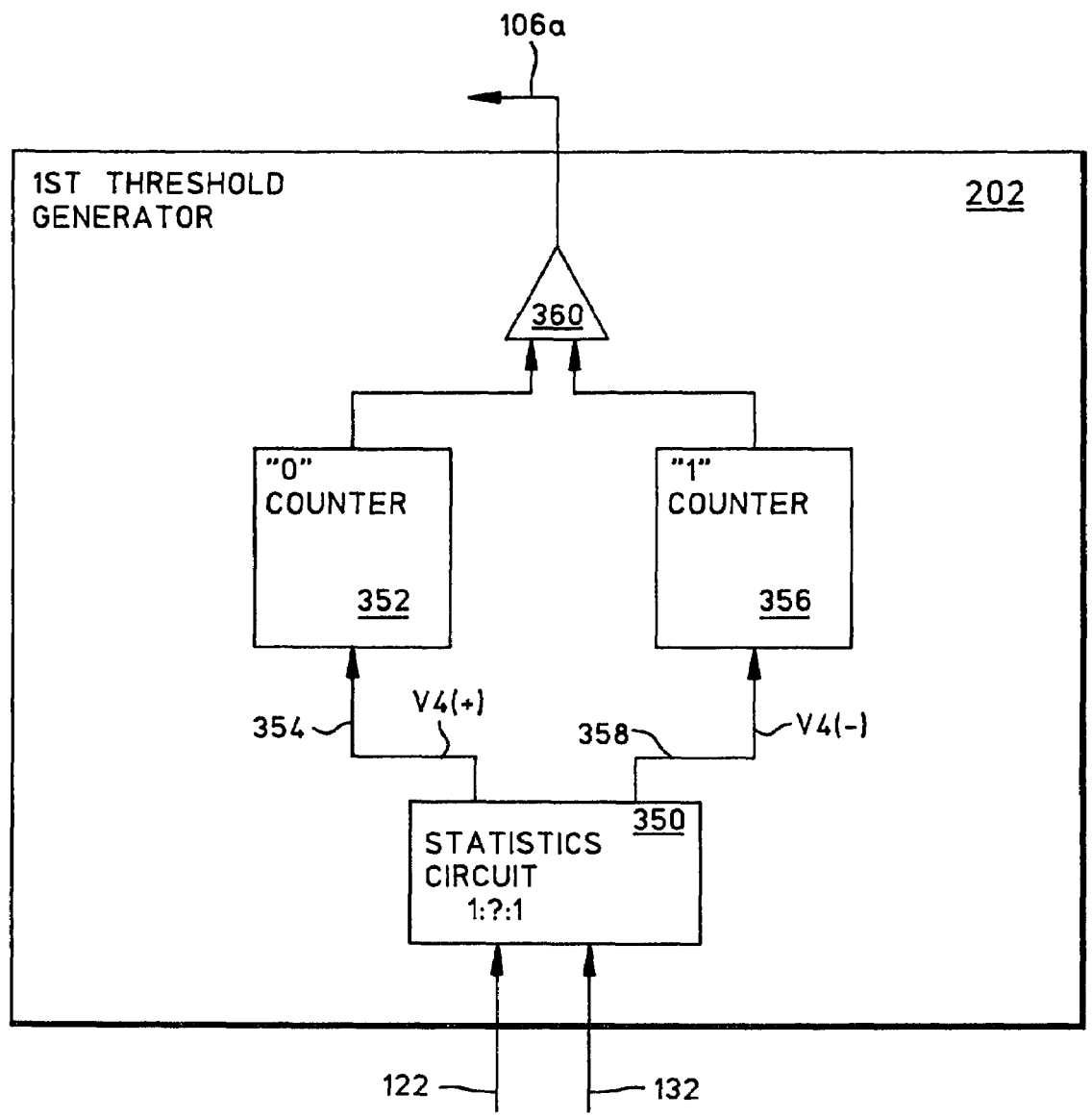
FIG. 8 is a schematic block diagram of the first threshold generator of FIG. 5, used to illustrate the counter embodiment.

FIG. 8 is a schematic block diagram of the first threshold generator 202 of FIG. 5, used to illustrate the counter embodiment. For each of the four conditions, registers separately tally the number of "1s" errors and the number of "0s" errors. The errors are the difference between the raw and corrected data. Separate V1± pins are also provided for each condition. Statistics are collected, and feedback pins toggled, when only one error is detected in the three-bit sequence described below. Statistics gathering is inhibited when data is known to be unreliable, such as during an uncorrectable event, loss of frame, or loss of clock.

The statistics circuit 350 examines bit value combinations where the pervious and subsequent bit value decisions are a "1". When a "0" error is detected, the "0" counter 352 is toggled with signal +V4 on line 354. When a "1" error is detected, the "1" counter 356 is toggled with signal −V4 on line 358. A summing circuit 360 reads the counters 352 and 356 and provides the first threshold (V1) on line 106a in response. The second and third threshold circuits would function in a similar manner. The summing circuit can supply an analog voltage or a digital signal that is converted into an analog voltage by the multi-threshold circuit.

FIG. 9 is a graph illustrating the operation of the threshold generators as embodied in FIG. 8. The statistics circuit examines corrected sequences, where "ER" represents an error. For example, an error in the sequence "1 0 1" generates a −V4 toggle, while an error in the sequence "1 1 1" generates a +V4 toggle.

The above-described equalization process has a significant effect on the overall performance of the channel. Modern optical channels employ a variety of dispersion management techniques. Dispersion management may be employed to various levels of complexity, and hence cost. The system of the present invention can be performed on a per fibre basis, or per lambda basis. In addition, management may be static or adaptive. In any case, it is expected that the signal will be left with a residual effect that may be addressed by the technique described above.

Figure 10A:
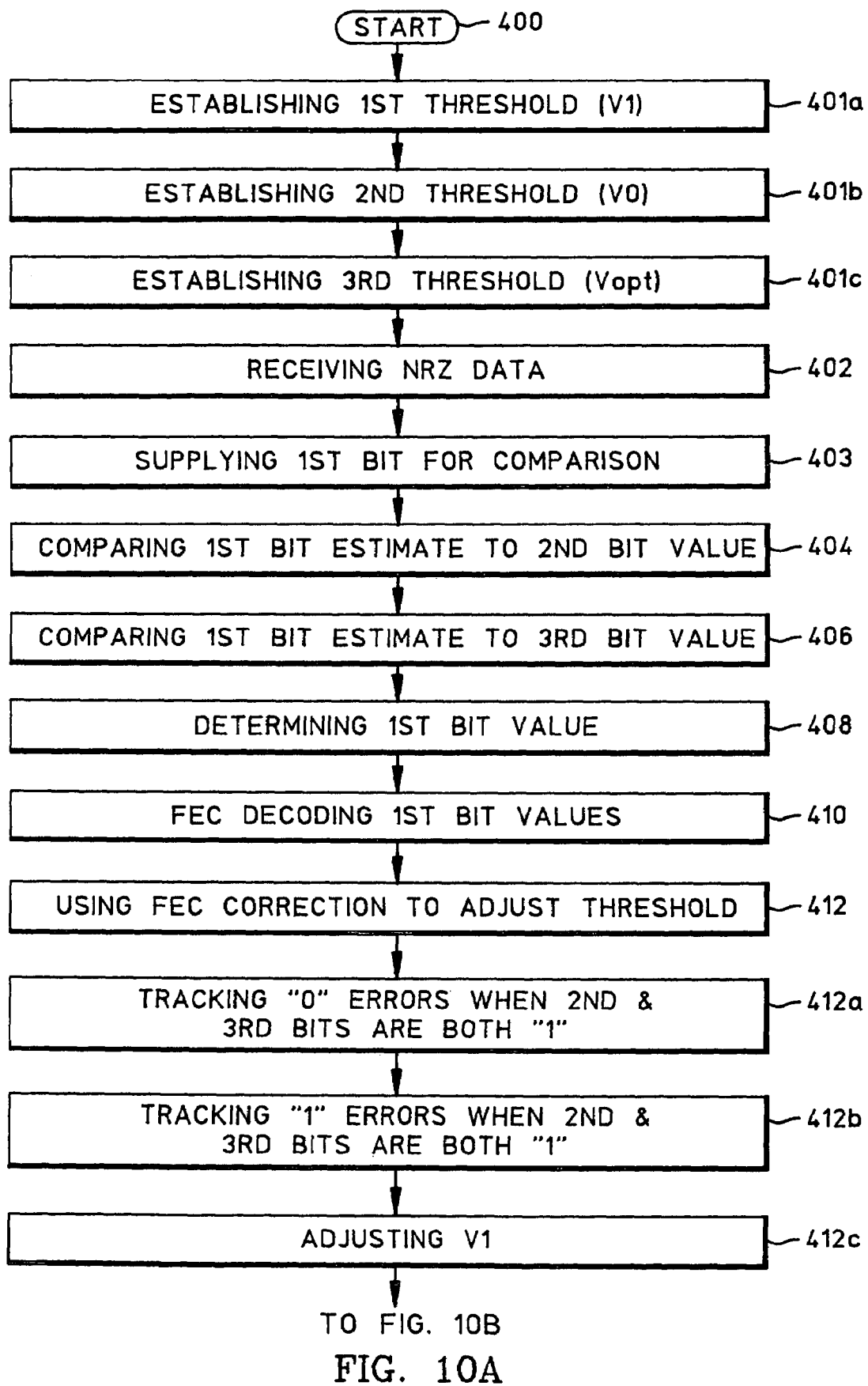
FIGS. 10a and 10b are flowcharts illustrating the present invention method for non-casual channel equalization in a communications system.
Figure 10B:
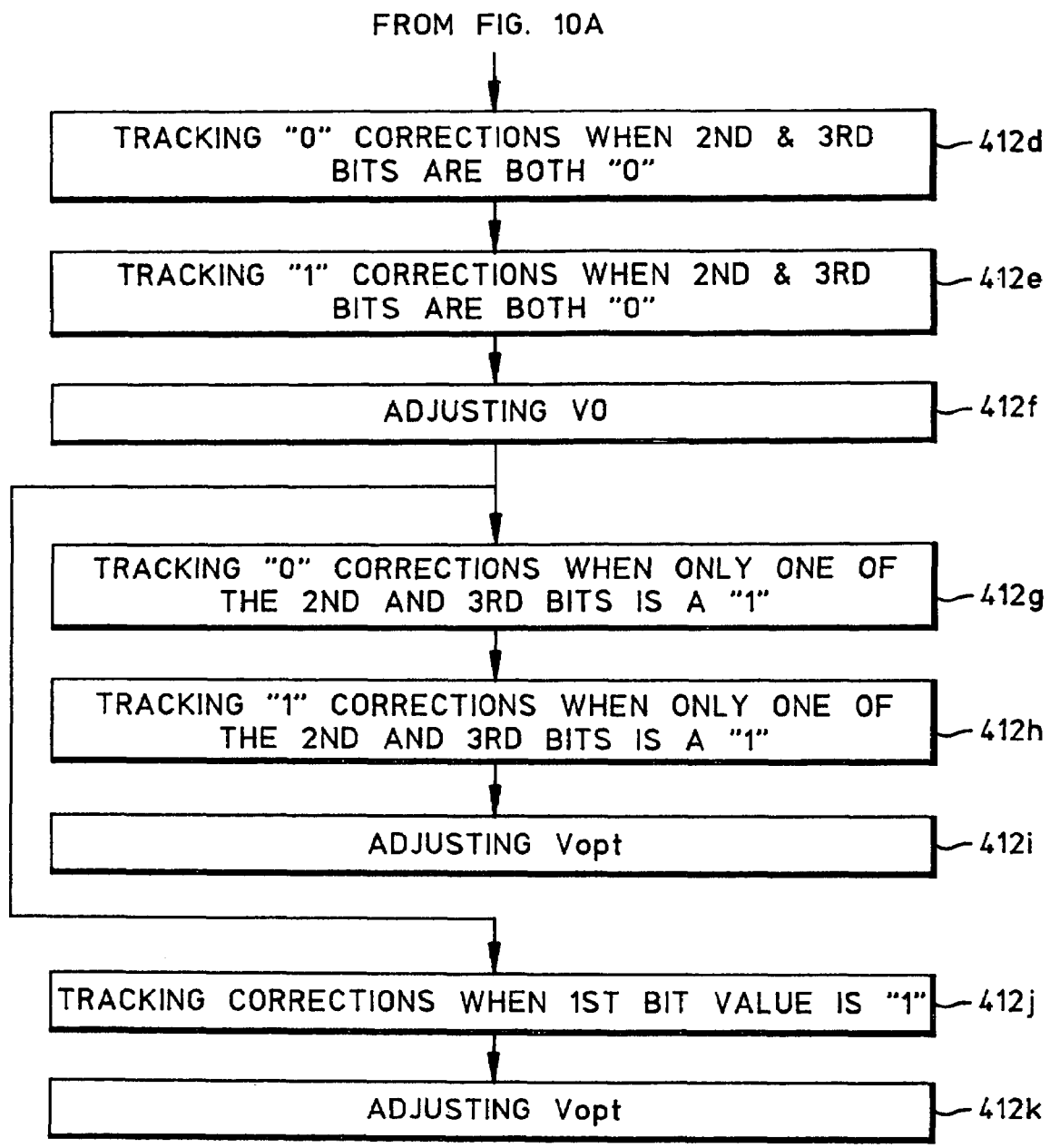

FIGS. 10a and 10b are flowcharts illustrating the present invention method for non-casual channel equalization in a communications system. This method generally corresponds to FIG. 3. Although the method (and the methods of FIGS. 11 and 12, below) is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 400. Step 401a establishes a first threshold (V1) to distinguish a high probability "1" first bit estimate. Step 401b establishes a second threshold (V0) to distinguish a high probability "0" first bit estimate. Step 401c establishes a third threshold (Vopt) for first bit estimates between the first and second thresholds. Step 402 receives a non-return to zero (NRZ) data stream input. Step 403 supplies the first bit estimate for comparison in response to distinguishing the NRZ data stream input at the first, second, and third thresholds. Step 404 compares the first bit estimate in the data stream to a second bit value received prior to the first bit. Step 406 compares the first bit estimate to a third bit value received subsequent to the first bit. Step 408, in response to the comparisons, determines the value of the first bit.

In some aspects of the method, establishing a third threshold (Vopt) to distinguish first bit estimates between the first and second thresholds in Step 401c includes substeps. Step 401c1 (not shown) distinguishes NRZ data stream inputs below the first threshold and above the third threshold as a "0" if both the second and third bits are "1" values, as a "1" if only one of the second and third values is a "1" value, and as a "1" if both the second and third bits are a "0" value. Step 401c2 (not shown) distinguishes NRZ data stream inputs above the second threshold and below the third threshold as a "1" if both the second and third bits are a "0" value, as a "0" if only one of the second and third values is a "0" value, and as a "0" if both the second and third bits are a "1" value.

In some aspects, receiving a non-return to zero data stream in Step 402 includes receiving a non-return to zero data stream encoded with forward error correction (FEC). Then, the method comprises further steps. Step 410, following the determination of the first bit values, FEC decodes the first bit values. Step 412 uses the FEC corrections of the first bit values to adjust the first, second, and third threshold values.

In some aspects of the method, using the FEC corrections of the first bit values to adjust the first, second, and third threshold values in Step 412 includes substeps. Step 412a tracks the number of corrections in the first bit when the first bit is determined to be a "0" value and the second and third bits are both "1" values. Step 412b tracks the number of corrections in the first bit when the first bit is determined to be a "1" value and the second and third bits are both "1" values. Step 412c adjusts the first threshold (V1) in response to corrections tracked when the second and third bits are both "1" values.

In some aspects, using the FEC corrections of the data stream to adjust the first, second, and third threshold values in Step 412 includes additional substeps. Step 412d tracks the number of corrections in the first bit when the first bit is determined to be a "0" value and the second and third bits are both "0" values. Step 412e tracks the number of corrections in the first bit when the first bit is determined to be a "1" value and the second and third bits are both "0" values. Step 412f adjusts the second threshold (V0) in response to corrections tracked when the second and third bits are both "0" values.

In some aspects, using the FEC corrections of the data stream to adjust the first, second, and third threshold values in Step 412 includes additional substeps. Step 412g tracks the number of corrections in the first bit when the first bit is determined to be a "0" value and only one of the second and third bits is a "1" value. Step 412h tracks the number of corrections in the first bit when the first bit is determined to be a "1" value and only of the second and third bits is a "1" value. Step 412i adjusts the third threshold (Vopt) in response to corrections tracked when only one of the second or third bit values is a "1" value.

As an alternative to Steps 412g through 412i, Step 412j tracks the number of corrections in the first bit when the first bit is determined to be a "1" value (alternately a "0" value). Step 412k adjusts the third threshold (Vopt) in response to corrections tracked when the first bit is determined to be a "1" value (alternately a "0" value). Note, this process does not consider the preceding or subsequent bits.

Figure 11:
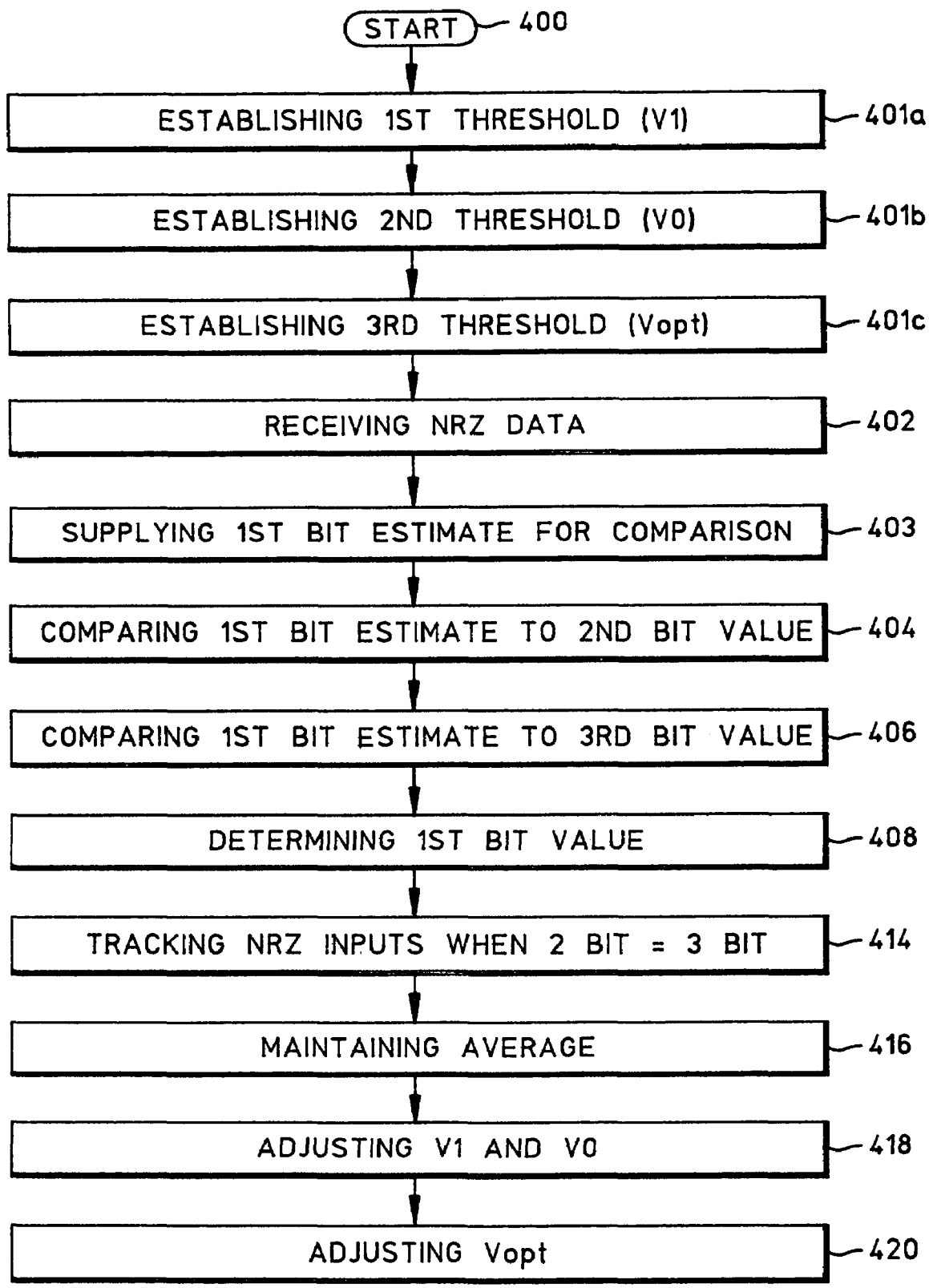
FIG. 11 is a flowchart illustrating an alternate embodiment of Step 412 of FIG. 10.

FIG. 11 is a flowchart illustrating an alternate embodiment of Step 412 of FIG. 10. Steps 400 through 408 are the same as in FIG. 10a and will not be repeated in the interest of brevity. The method generally corresponds to FIG. 6 and uses some alternate steps from those shown in FIGS. 10a and 10b. Step 414 tracks the NRZ data stream inputs when the second bit value equals the third bit value. Step 416 maintains long-term averages of the tracked NRZ data stream inputs. Step 418 adjusts the first and second thresholds in response to the long-term averages.

In some aspects of the method, tracking the NRZ data stream inputs when the second bit value equals the third bit value in Step 414 includes substeps (not shown). Step 414a tracks the NRZ data stream inputs when the second and third bits both have "1" values. Step 414b tracks the NRZ data stream inputs when the second and third bits have "0" values.

In other aspects, maintaining long-term averages of the tracked NRZ data stream inputs in Step 416 includes substeps (not shown). Step 416a creates a first average of the NRZ data stream inputs when the second and third bits are both "1" values. Step 416c creates a second average of the NRZ data stream inputs when the second and third bits are both "0" values.

In some aspects, adjusting the first and second thresholds in response to the long-term averages in Step 418 includes substeps (not shown). Step 418a adjusts the first threshold (V1) in response to the first average. Step 418b adjusts the second threshold (V0) in response to the second average.

Some aspects of the invention include a further step. Step 420 adjusts the third threshold (Vopt) in response to adjusting the first (V1) and second (V0) thresholds in Step 418a and 418b, respectively. For example, the third threshold can be set to approximately midway between the first and second thresholds. Alternately, Step 420 includes substeps not shown. Step 420a measures the average NRZ data stream input voltage. That is, the voltage is measured constantly with regard to temporal analysis of the bit values. Step 420b sets the third threshold in response to the measured average.

Figure 12:
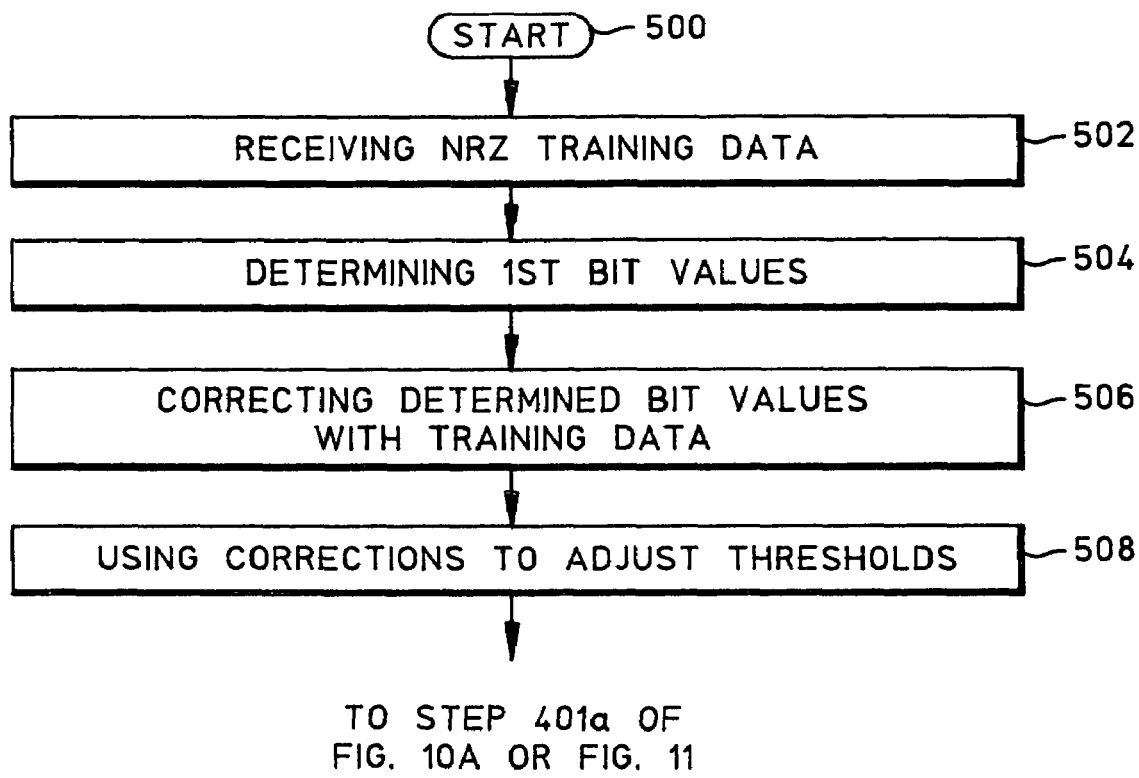
FIG. 12 is a flowchart illustrating the training aspect of the present invention method.

FIG. 12 is a flowchart illustrating the training aspect of the present invention method. These steps could be used prior to Steps 401a of either FIG. 10a or FIG. 11. The method starts at Step 500. Step 502 receives predetermined training data prior to receiving the (nondeterministic) NRZ data stream (Step 402 of either FIG. 10a or FIG. 11). Step 504 determines first bit values from the training data. This process would equivalent to Step 403 through Step 408 of FIGS. 10a and 11. Step 506 corrects the determined first bit values with the predetermined training data. Step 508 uses the corrections of the first bit values to adjust the first, second, and third threshold values.

A system and method have been provided for non-casually adjusting a NRZ data stream channel. Because inter-symbol dispersion is a non-casual impairment, the estimation algorithms are more effective when based upon iteratively collected data. The degree of iteration affects the performance of the circuit and is selected based upon the implementation tradeoffs. It is expected that those skilled in the art could implement the collection of such data. Although exemplary analysis algorithms using only the preceding and subsequent bits have been explicitly described, the present invention would obviously apply to algorithms using one than one preceding or subsequent bit value. Other embodiments and variations of the invention will occur to those skilled in the art.

We claim:

1. In a communications system, a method for non-causal channel equalization, the method comprising:
   receiving a non-return to zero (NRZ) data stream input;
   comparing a first bit estimate for a current clock cycle, to a second bit value received in a prior clock cycle;
   comparing the first bit estimate to a third bit value received in a subsequent clock cycle; and,
   in response to the comparisons, determining a first bit value for the current clock cycle.

2. The method of claim 1 further comprising:
   establishing a first threshold (V1) to distinguish a high probability "1" first bit estimate;
   establishing a second threshold (V0) to distinguish a high probability "0" first bit estimate;
   establishing a third threshold (Vopt) to distinguish first bit estimates between the first and second thresholds;
   supplying the first bit estimate for comparison in response to distinguishing the NRZ data stream input at the first, second, and third thresholds.

3. The method of claim 2 wherein establishing a third threshold (Vopt) to distinguish first bit estimates between the first and second thresholds includes:
   distinguishing NRZ data stream inputs below first threshold and above the third threshold as a "0" if both the second and third bits are "1" values, as a "1" if only one of the second and third bits is a "1" value, and as "1" if both the second and third bits are a "0" value; and,
   distinguishing NRZ data stream inputs above the second threshold and below the third threshold as a "1" if both the second and third bits are a "0" value, as a "0" if only one of the second and third values is a "0" value, and as a "0" if both the second and third bits are a "1" value.

4. The method of claim 3 wherein receiving a non-return to zero data stream includes receiving a non-return to zero data stream encoded with forward error correction (FEC); the method further comprising:
   following the determination of the first bit values, FEC decoding the first bit values; and,
   using the FEC corrections of the first bit values to adjust the first, second, and third threshold values.

5. The method of claim 4 wherein using the FEC corrections of the first bit values to adjust the first, second, and third threshold values includes:
   tracking the number of corrections in the first bit when the first bit is determined to be a "0" value and the second and third bits are both "1" values;
   tracking the number of corrections in the first bit when the first bit is determined to be a "1" value and the second and third bits are both "1" values; and,
   adjusting the first threshold (V1) in response to corrections tracked when the second and third bits are both "1" values.

6. The method of claim 5 wherein using the FEC corrections of the data stream to adjust the first, second, and third threshold values includes:
   tracking the number of corrections in the first bit when the first bit is determined to be a "0" value and the second and third bits are both "0" values;
   tracking the number of corrections in the first bit when the first bit is determined to be a "1" value and the second and third bits are both "0" values; and,
   adjusting the second threshold (V0) in response to corrections tracked when the second and third bits are both "0" values.

7. The method of claim 6 wherein using the FEC corrections of the data stream to adjust the first, second, and third threshold values includes:
   tracking the number of corrections in the first bit when the first bit is determined to be a "0" value and only one of the second and third bits is a "1" value; and,
   tracking the number of corrections in the first bit when the first bit is determined to be a "1" value and only of the second and third bits is a "1" value; and,
   adjusting the third threshold (Vopt) in response to corrections tracked when only one of the second or third bit values is a "1" value.

8. The method of claim 6 wherein using the FEC corrections of the data stream to adjust the first, second, and third threshold values includes:

tracking the number of corrections in the first bit when the first bit is determined to be a "1" value; and, adjusting the third threshold (Vopt) in response to corrections tracked when the first bit is determined to be a "1" value.

9. The method of claim 3 further comprising:
tracking the NRZ data stream inputs when the second bit value equals the third bit value;
maintaining long-term averages of the tracked NRZ data stream inputs; and,
adjusting the first and second thresholds in response to the long-term averages.

10. The method of claim 9 wherein tracking the NRZ data stream inputs when the second bit value equals the third bit value includes:
tracking the NRZ data stream inputs when the second and third bits both have "1" values; and,
tracking the NRZ data stream inputs the second and third bite have "0" values.

11. The method of claim 10 wherein maintaining long-term averages of the NRZ data stream inputs includes:
creating a first average of the NRZ data stream inputs when the second and third bits are both "1" values; and,
creating a second average of the NRZ data stream inputs when the second and third bits are both "0" values.

12. The method of claim 11 wherein adjusting the first and second thresholds in response to the long-term averages includes:
adjusting the first threshold (V1) in response to the first average; and,
adjusting the second threshold (V0) in response to the second average.

13. The method of claim 12 further comprising:
adjusting the third threshold (Vopt) in response to adjusting the first (V1) and second (V0) thresholds.

14. The method of claim 13 wherein adjusting the third threshold (Vopt) in response to adjusting the first (V1) and second (V0) thresholds includes setting the third threshold approximately midway between the first and second thresholds.

15. The method of claim 9 further comprising:
measuring the average NRZ data stream input voltage; and,
setting the third threshold in response to the measured average.

16. The method of claim 3 further comprising:
prior to receiving the NRZ data stream, receiving predetermined training data;
determining first bit values from the training data;
correcting the determined first bit values with the predetermined training data; and,
using the corrections of the first bit values to adjust the first, second, and third threshold values.

17. In a communications system, a method for non-causal channel equalization, the method comprising:
receiving a data stream input;
comparing a first bit estimate for a current clock cycle to a second bit value received in a prior clock cycle;
comparing the first bit estimate to a third bit value received in a subsequent clock cycle; and,
in response to the comparisons, determining a first bit value for the current clock cycle.

18. The method of claim 17 further comprising:
establishing a first threshold (V1) to distinguish a high probability "1" first bit estimate;
establishing a second threshold (V0) to distinguish a high probability "0" first bit estimate;
establishing a third threshold (Vopt) to distinguish first bit estimates between the first and second thresholds;
supplying the first bit estimate for comparison in response to distinguishing the data stream input at the first, second, and third thresholds.

19. The method of claim 18 wherein establishing a third threshold (Vopt) to distinguish first bit estimates between the first and second thresholds includes:
distinguishing data stream inputs below first threshold and above the third threshold as a "0" if both the second and third bits are "1" values, as a "1" if only one of the second and third bits is a "1" value, and as "1" if both the second and third bits are a "0" value; and,
distinguishing data stream inputs above the second threshold and below the third threshold as a "1" if both the second and third bits are a "0" value, as a "0" if only one of the second and third values is a "0" value, and as a "0" if both the second and third bits are a "1" value.

20. The method of claim 19 wherein receiving a data stream includes receiving the data stream encoded with forward error correction (FEC);
the method further comprising:
following the determination of the first bit values, FEC decoding the first bit values; and,
using the FEC corrections of the first bit values to adjust the first, second, and third threshold values.

* * * * *